United States Patent
Beattie, Jr. et al.

(10) Patent No.: US 9,794,627 B2
(45) Date of Patent: *Oct. 17, 2017

(54) SYSTEM AND METHOD OF CONTENT ACQUISITION AND DELIVERY

(71) Applicant: AT&T Intellectual Property I, L.P., Atlanta, GA (US)

(72) Inventors: James Gordon Beattie, Jr., Bergenfield, NJ (US); Soumyajit Chakraborty, Harrison, NJ (US); Stephen J. Griesmer, Westfield, NJ (US); Roque Rios, Haskell, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,762

(22) Filed: Jul. 11, 2014

(65) Prior Publication Data
US 2014/0325562 A1    Oct. 30, 2014

Related U.S. Application Data

(63) Continuation of application No. 13/595,012, filed on Aug. 27, 2012, now Pat. No. 8,819,737.

(51) Int. Cl.
*H04N 5/445* (2011.01)
*H04N 21/458* (2011.01)
(Continued)

(52) U.S. Cl.
CPC ..... *H04N 21/4583* (2013.01); *G06Q 10/1093* (2013.01); *H04N 21/2747* (2013.01);
(Continued)

(58) Field of Classification Search
CPC ............... H04N 21/47214; H04N 21/472
(Continued)

(56) References Cited

U.S. PATENT DOCUMENTS 6,344,878 B1    2/2002    Emura
6,532,589 B1    3/2003    Proehl et al.
(Continued)

OTHER PUBLICATIONS

Takahashi, Hideyuki, et al., "Design and Implementation of an Agent-based Middleware for Context-aware Ubiquitous Services", Proceedings of the 2005 Conference on New Trends in Software Methodologies, Tools and Techniques: Proceedings of the Fourth SoMeT_W05, pp. 330-350.

*Primary Examiner* — Pankaj Kumar
*Assistant Examiner* — Sahar Baig
(74) *Attorney, Agent, or Firm* — Toler Law Group, PC

(57) ABSTRACT

A method includes creating a first calendar event in an electronic calendar associated with a user. The first calendar event corresponds to a first viewing time and is associated with delivery of media content to a first device associated with the user. The method further includes rescheduling the first calendar event in response to determining that a scheduling conflict exists between the first calendar event and a second calendar event. Rescheduling the first calendar event includes modifying the first calendar event to correspond to a second viewing time and determining, based on the second viewing time, a second device to deliver the media content to. The second device is associated with the user.

20 Claims, 11 Drawing Sheets

(51) Int. Cl.

| | |
|---|---|
| *H04N 21/45* | (2011.01) |
| *H04N 21/472* | (2011.01) |
| *H04N 21/488* | (2011.01) |
| *H04N 21/482* | (2011.01) |
| *G06Q 10/10* | (2012.01) |
| *H04N 21/2747* | (2011.01) |
| *H04N 21/4147* | (2011.01) |
| *H04N 21/433* | (2011.01) |
| *H04N 21/434* | (2011.01) |

(52) U.S. Cl.
CPC ..... *H04N 21/4147* (2013.01); *H04N 21/4334* (2013.01); *H04N 21/4345* (2013.01); *H04N 21/45* (2013.01); *H04N 21/458* (2013.01); *H04N 21/472* (2013.01); *H04N 21/47214* (2013.01); *H04N 21/482* (2013.01); *H04N 21/4882* (2013.01)

(58) Field of Classification Search
USPC .................................................. 725/58, 61
See application file for complete search history.

(56) References Cited

U.S. PATENT DOCUMENTS

| | | | |
|---|---|---|---|
| 6,681,396 B1 * | 1/2004 | Bates et al. ..................... 725/58 | |
| 7,072,932 B1 | 7/2006 | Stahl | |
| 7,558,469 B2 | 7/2009 | Rudolph et al. | |
| 7,971,219 B2 * | 6/2011 | Iino ................................ 725/58 | |
| 8,195,025 B2 | 6/2012 | Branam et al. | |
| 8,369,772 B2 | 2/2013 | Petruzzelli | |
| 8,451,379 B2 | 5/2013 | Goldey et al. | |
| 8,566,808 B2 | 10/2013 | Schreter | |
| 8,607,297 B2 | 12/2013 | Kummer et al. | |
| 9,060,161 B2 * | 6/2015 | Oliver ................. H04N 21/4334 | |
| 9,392,209 B1 * | 7/2016 | Kotab ..................... H04L 29/06 | |
| 2003/0086694 A1 | 5/2003 | Davidsson | |
| 2003/0140342 A1 | 7/2003 | Hasebe et al. | |
| 2005/0055716 A1 * | 3/2005 | Louie .................... G06F 1/1632 | |
| | | | 725/58 |
| 2005/0229211 A1 * | 10/2005 | Iino .................... H04N 5/44543 | |
| | | | 725/58 |
| 2006/0051058 A1 | 3/2006 | Rudolph et al. | |
| 2008/0091718 A1 | 4/2008 | Barsness et al. | |
| 2008/0155598 A1 | 6/2008 | Lee et al. | |
| 2009/0100332 A1 | 4/2009 | Kanjilal et al. | |
| 2009/0142036 A1 | 6/2009 | Branam et al. | |
| 2010/0333137 A1 * | 12/2010 | Hamano et al. ................. 725/39 | |
| 2011/0162020 A1 * | 6/2011 | Kahn ................. H04N 21/4263 | |
| | | | 725/82 |
| 2012/0315021 A1 * | 12/2012 | Schwesinger ...... H04N 5/44543 | |
| | | | 386/292 |
| 2014/0007154 A1 | 1/2014 | Seibold et al. | |
| 2016/0132836 A1 * | 5/2016 | Cronin ................. G06Q 10/109 | |
| | | | 705/7.19 |

* cited by examiner

Week of May 14

| Monday 14 | Tuesday 15 | Wednesday 16 | Thursday 17 | Friday 18 |
|---|---|---|---|---|
| All day Travel | All day Travel | 10:00AM–10:30AM Meeting <br> 4:00PM–4:30PM View Dr. Porter <br> 5:00PM–5:30PM Meeting | 8:30AM–10:30AM Meeting | 5:30PM–6:30PM Gym |

FIG. 3

Week of May 14

| Monday 14 | Tuesday 15 | Wednesday 16 | Thursday 17 | Friday 18 |
|---|---|---|---|---|
| All day Travel | All day Travel | All Day Travel (304) / 502 | 8:30AM–10:30AM Meeting | |
| | | 4:00PM–4:30PM View *Dr. Porter* (306) | | 5:30PM–6:30PM Gym |

SYSTEM AND METHOD OF CONTENT ACQUISITION AND DELIVERY

CROSS REFERENCE TO RELATED APPLICATIONS

This application is a continuation of and claims priority from U.S. patent application Ser. No. 13/595,012, filed Aug. 27, 2012 and entitled "SYSTEM AND METHOD OF CONTENT ACQUISITION AND DELIVERY," which is hereby incorporated by reference in its entirety.

FIELD OF THE DISCLOSURE

The present disclosure is generally related to content acquisition and delivery.

BACKGROUND

Broadcast content may be scheduled for recording at specified devices by a user. However, the particular device that the content is recorded to may not be accessible by the user at a viewing time at which the user desires to view the content. For example, the user may schedule recording of a program at a set-top box device at the user's home and plan to watch the recorded program over the weekend, without remembering that she is scheduled to be traveling over the weekend.

BRIEF DESCRIPTION OF THE DRAWINGS

FIG. 3 is a diagram to illustrate a particular example of a user calendar that may be displayed by the system of FIG. 1;

FIG. 5 is a diagram to illustrate another particular example of the user calendar that may be displayed by the system of FIG. 1;

DETAILED DESCRIPTION

Figure 1:
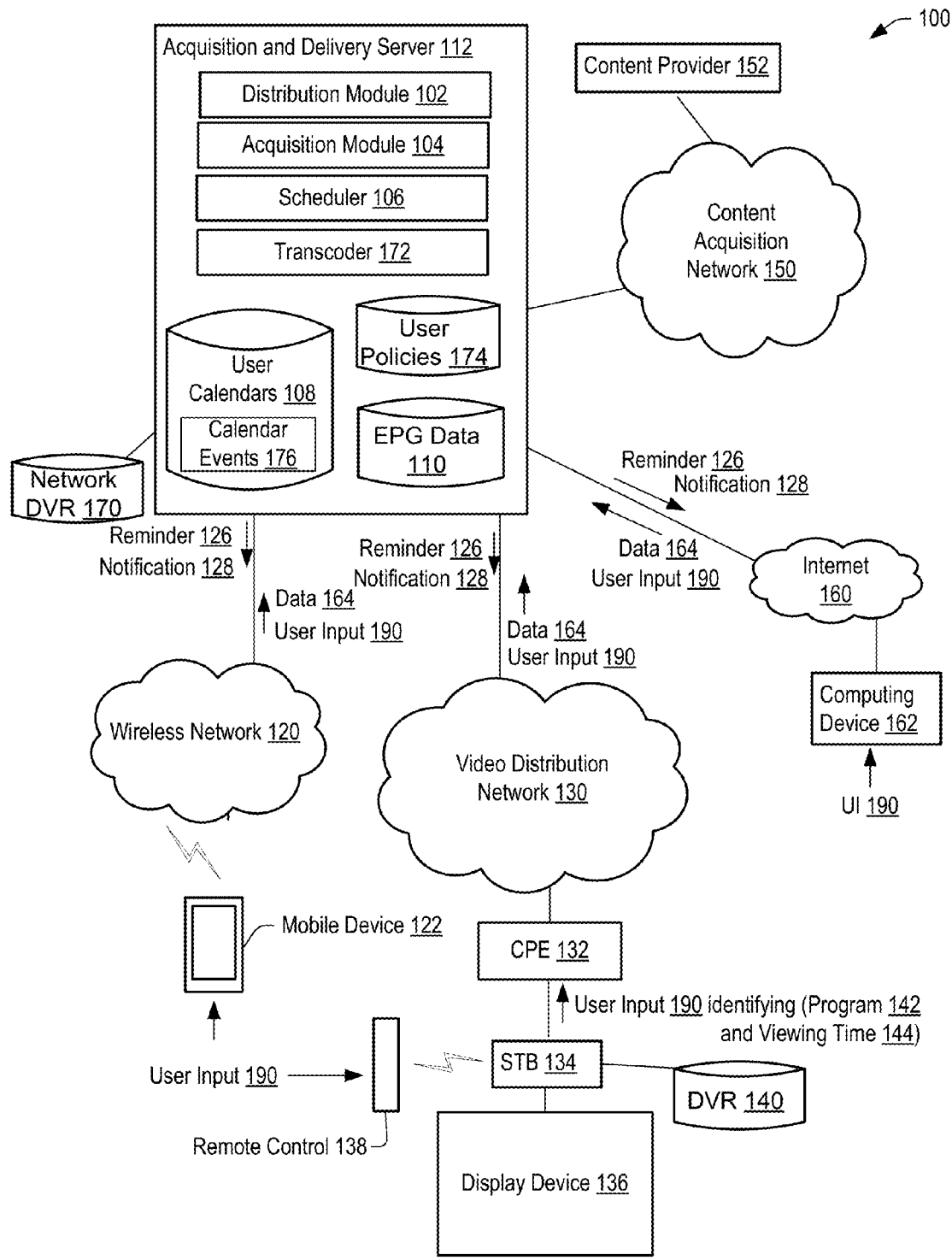
FIG. 1 is a block diagram of a particular illustrative embodiment of a system that is operable to acquire and deliver content.

A system and method of content acquisition and delivery that may be synchronized with a user calendar is disclosed. In addition to scheduling recordings, the disclosed techniques may enable a user to schedule (e.g., in an electronic calendar) desired viewing times for the recordings. The disclosed techniques may schedule acquisition of broadcast content based on a viewing time at which the user desires to view the content. For example, when the user wants to watch a "live" show on Saturday at 3 PM, acquisition may be scheduled substantially contemporaneously with the viewing time (i.e., on Saturday at 3 PM). Alternatively, when the viewer wants to watch the show on Tuesday after the show airs on Saturday, acquisition of the show may be scheduled earlier than the viewing time. The disclosed techniques may also utilize the user's calendar to automatically determine what device or devices (e.g., a set-top box device, a mobile phone, etc.) to deliver the content to. The determination may be based on the viewing time and calendar events in the user's calendar. For example, when a calendar event prior to the viewing time and/or a calendar event subsequent to the viewing time indicate that the user will be at work, the content may be delivered to a mobile device associated with the user instead of a set-top box device at the user's home. On the other hand, if the prior calendar event and/or the subsequent calendar event indicate that the user will be at home, the content may be delivered to the set-top box device.

In a particular embodiment, a method includes receiving, at an electronic device, a first input from a user identifying a program and a viewing time. The method includes creating a first calendar event corresponding to the viewing time in an electronic calendar associated with the user. The method also includes determining a first device to deliver the program to, where the first device is associated with the user. The determination is based on the viewing time and a second calendar event in the electronic calendar. The method further includes delivering the program to the first device.

In another particular embodiment, a computer-readable medium stores instructions that, when executed by a processor, cause the processor to receive, at an electronic device, input from a user identifying a program and a viewing time. The instructions are also executable to cause the processor to schedule acquisition of the program at an acquisition time that is earlier than the viewing time and that is later than a broadcast time of the program. The instructions are further executable to cause the processor to acquire the program at the acquisition time.

In another particular embodiment, a system includes a processor and an acquisition module executable by the processor to receive input identifying a program and a viewing time. The acquisition module is also executable by the processor to schedule acquisition of the program at an acquisition time that is earlier than the viewing time and later than a broadcast time of the program. The acquisition module is further executable by the processor to acquire the program at the acquisition time. The system also includes a scheduler executable by the processor to create a first calendar event corresponding to the viewing time in an electronic calendar associated with a user. The system includes a distribution module executable by the processor to determine a first device to deliver the acquired program to, where the first device is associated with the user. The determination is based on the viewing time and a second calendar event in the electronic calendar. The distribution module is further configured to deliver the acquired program to the first device.

Referring to FIG. 1, a block diagram of a particular illustrative embodiment of a system that is operable to acquire and deliver content is illustrated and is generally designated 100. The system 100 may include an acquisition and delivery server 112 communicatively coupled to a mobile device 122 (e.g., a cell phone, a tablet computer, etc.) via a wireless network 120, a set-top box device 134 via a video distribution network 130, a computing device 162 (e.g., a laptop computer, a desktop computer, etc.) via internet 160, or any combination thereof. In particular embodiments, components of the system 100 may be implemented in hardware and/or as instructions executable by a processor, as further described with reference to FIG. 11.

The set-top box device 134 may be communicatively coupled to the video distribution network 130 via customer premises equipment (CPE) 132 (e.g., a router, a residential gateway, etc.). The set-top box device 134 may also be communicatively coupled to a display device 136 (e.g., a television) and to a remote control 138. The set-top box device 134 may further be communicatively coupled to, or include, a digital video recorder (DVR) 140.

The acquisition and delivery server 112 may be a network-accessible computing device, such as a server computer. The acquisition and delivery server 112 may include a distribution module 102, an acquisition module 104, a scheduler 106, a transcoder 172, or any combination thereof. The acquisition and delivery server 112 may also store or otherwise have access to user calendars 108, user policies 174, electronic program guide (EPG) data 110, or any combination thereof. The EPG data 110 may include information descriptive of media programs that are accessible by the user (e.g., based on a user account). The user calendars 108 may include calendar events 176, where each calendar event may correspond to an activity or a location associated with the user (e.g., traveling, watching a program, in a meeting, at work, at home, at the gym, etc.). The acquisition and delivery server 112 may be communicatively coupled to a content provider 152 (e.g., a television programming provider, an on-demand content provider, etc.) via a content and acquisition network 150. The acquisition and delivery server 112 may be communicatively coupled to a network DVR 170.

The system 100 may generally be configured such that each of the devices 122, 134, and 162 can receive similar input, generate similar output, and perform similar functions. During operation, the user may pull up an EPG display on one of the devices. A particular example of an EPG display is further described with reference to FIG. 2. The user may provide user input 190 identifying a program 142 and a viewing time 144. The viewing time 144 may indicate a time at which the user desires to view the program 142. The user input 190 may be received by the mobile device 122, the set-top box device 134, the computing device 162, or any combination thereof. For example, the user input 190 may be received via an input interface of the mobile device 122 (e.g., a touch screen, etc.), via the remote control 138, and/or an input device of the computing device 162 (e.g., a keyboard, a mouse, etc.). The user input 190 may be sent to the acquisition and delivery server 112.

In response to the user input 190, the scheduler 106 may create a first calendar event in an electronic calendar of the user. For example, the first calendar event may correspond to the viewing time 144. The user calendars 108 may include the electronic calendar of the user, and the first calendar event may be added to the calendar events 176. Particular examples of the electronic calendar of the user are described with reference to FIGS. 3-5. In a particular embodiment, the scheduler 106 may send a reminder 126 based on the viewing time 144 to remind the user regarding the scheduled program 142. The reminder 126 may be sent to at least one device (e.g., the computing device 162, the set-top box device 134, the mobile device 122, etc.) associated with the user. In response to the reminder 126, the user may want to reschedule the first calendar event. The scheduler 106 may reschedule the first calendar event based on user input indicating that the user wants to change the viewing time 144.

Before the program 142 can be viewed by the user, the acquisition module 104 may schedule acquisition of the program 142 at an acquisition time. In a particular embodiment, the acquisition time may be earlier than the viewing time 144 and later than a broadcast time of the program 142. For example, the user may want to watch the program 142 on Saturday at 3 PM. The program 142 may be airing "live" on Thursday at 7 PM, and a rerun of the program 142 may be airing on Friday at 9 am. Acquisition of the program may be scheduled on Friday morning instead of Thursday night based on the Saturday viewing time because, for instance, bandwidth usage on Friday morning may be lower than bandwidth usage on Thursday evening during prime time. Acquiring the program may include recording all or a portion of the program 142. For example, the acquisition module 104 may record the portion or all of the program 142 at a network-based storage device (e.g. the network DVR 170), instruct a storage device (e.g., DVR 140) of a set-top box device associated with the user to record the portion or the program 142, or any combination thereof.

At or before the viewing time, the distribution module 102 may determine what device (e.g., the computing device 162, the set-top box device 134, the mobile device 122, etc.) to deliver the acquired program 142 to. The determination may be based on the viewing time 144 and a second calendar event in the user calendar. For example, when the second calendar event overlaps the first calendar event and indicates that the user will be traveling, the program 142 may be delivered to the mobile device 122 instead of the set-top box device 134. Alternatively, when the viewing time 144 corresponds to a weekend and the user's calendar indicates that the user is usually at home on the weekend, the program 142 may be delivered to the set-top box device 134. In a particular embodiment, the program 142 may be delivered at a delivery time earlier than the viewing time 144 (e.g., "pushed" via download). For example, the program 142 may be airing on Friday at 10 AM, the user may want to watch the program 142 on Saturday at 3 PM, and the determined device may be the set-top box device 134 at the user's home. The distribution module 102 may deliver the program 142 to the set-top box device 134 on Saturday at 2 AM to be recorded at the DVR 140, so that the program 142 is accessible to the user at home on Saturday at 3 PM.

In a particular embodiment, when the viewing time 144 is substantially contemporaneous with the acquisition time (e.g., the user input 190 indicates that the user desires to watch a "live" event as it occurs), the distribution module 102 may send a stream of the program 142 to the device, or authorize/enable the device to receive the stream of the program 142, at the viewing time 144.

In a particular embodiment, the system 100 may support policy-driven content acquisition or delivery. For example, the user policies 174 may include a user policy associated with the user. The scheduler 106 may determine that the user policy indicates that the program 142 may not be delivered to a particular device at the viewing time 144. To illustrate, the user policy may indicate that the program 142 is blocked, the user is blocked, the particular device is blocked, or any combination thereof. For example, the user policy may indicate that no programming is to be scheduled for delivery to the mobile device 122, no children's programming is to be scheduled for viewing during school hours, only educational programming may be scheduled for delivery to the computing device 162, a particular user is not to schedule horror movies for viewing, etc. The program 142 may be blocked based on genre, keywords, title, description, rating, cast, crew, etc. In response to determining that the user policy indicates that the program 142 may not be made available to the user, the scheduler 106 may remove the first calendar event from the user calendar.

In a particular embodiment, the system 100 may support dynamic adjustments to content acquisition and/or delivery based on user calendars. For example, the calendar event corresponding to the viewing time 144 may be rescheduled by the scheduler 106. In a particular embodiment, the scheduler 106 may determine that a second calendar event conflicts with the first calendar event and notify the user regarding the conflict. In response to determining the conflict, the scheduler 106 may reschedule the first calendar event, the second calendar event, or any combination thereof. An example of rescheduling a calendar event is further described with reference to FIG. 4. Rescheduling the first calendar event may include the scheduler 106 modifying the first calendar event to correspond to a second viewing time. In addition, rescheduling the first calendar event may include the acquisition module 104 rescheduling acquisition of the program 142.

Rescheduling a calendar event may further include the distribution module 102 determining a different device to receive delivery of the program 142 based, at least in part, on a different viewing time. For example, the user may have scheduled viewing of a show on Thursday afternoon when a calendar event in the user's calendar indicates that the user will be traveling. In response, the distribution module 102 may determine that the show is to be delivered to the mobile device 122. Subsequently, the user may reschedule the viewing to Saturday afternoon, and a calendar event in the user's calendar may indicate that the user will be at home on Saturday. In response, the distribution module 102 may determine that the show is to be delivered to the set-top box device 134 instead of to the mobile device 122.

In a particular embodiment, the system 100 may support multiple devices and content may be formatted differently for different devices (e.g., different aspect ratios, bitrates, etc.). The transcoder 172 may selectively transcode the program 142 to a format (e.g., 4:3 aspect ratio, 16:9 aspect ratio, 16:10 aspect ratio, 320p resolution, 360p resolution, 480p resolution, 576p resolution, 720p resolution, 1080p resolution, 180 kilobits per second (kbits/s), 3.5 megabits per second (mbits/s), 40 mbits/s, Moving Pictures Experts Group (MPEG)-1, MPEG-2, MPEG-4, International Telecommunication Union Telecommunication Standardization Sector (ITU-T) H.264, Advanced Video Coding (AVC), Third Generation Platform (3GP), Windows Media Video (WMV), Society of Motion Picture and Television Engineers (SMPTE), Scalable Video Coding (SVC), Flash Video (FLV), etc.) supported by a device prior to delivering the program 142 to the device.

At or before the viewing time, the distribution module 102 may deliver the program 142 to the device. After the viewing time, the device may send data 164 to the acquisition and delivery server 112 indicating whether the program 142 was viewed by the user at the device. The device may generate and send the data 164 in response to a query from the acquisition server 112 or automatically after the viewing time. The data 164 may indicate whether a beginning portion of the program 142 was viewed, whether an ending portion of program 142 was viewed, or any combination thereof. In response to determining that the program 142 was not viewed based on the data 164, the acquisition and delivery server 112 may send a notification 128 related to the program 142 to at least one device (e.g., the computing device 162, the set-top box device 134, the mobile device 122, etc.) associated with the user. For example, the notification 128 may inform the user that the program 142 was not viewed, may ask whether the user would like to reschedule the viewing of the program 142, may inform the user that the viewing of the program 142 has been automatically rescheduled to a new viewing time that has been added to the user's calendar, may inform the user that the program 142 will be delivered to the set-top box device 134, or any combination thereof. In response to determining that the program 142 was not viewed, the scheduler 106 may reschedule the first calendar event. Alternatively, or in addition, the distribution module 102 may deliver the program 142 to the DVR 140 via the set-top box device 134 in response to determining that the program 142 was not viewed. The DVR 140 may thus serve as a "backup" delivery device that is used when programs scheduled for viewing were not viewed.

The system 100 may thus enable content acquisition and delivery, and viewing of content may be synchronized with a user's calendar. The system 100 of FIG. 1 may be used to automatically deliver content to a user device based on calendar events associated with the user's calendar. The device may be dynamically determined, so that the user may not have to manually specify a different device when the user's schedule changes. Further, the viewing of content may be automatically rescheduled. Hence, the user may not have to manually specify a different viewing time when there is a conflicting event in the user's calendar. The system 100 of FIG. 1 may also be used to automatically schedule acquisition of the content based on the viewing time. Acquisition of the content may be scheduled such that the content will be accessible to the user at the viewing time. The content may be acquired at an acquisition time based on lower bandwidth usage, lower billing rates, etc.

Figure 2:
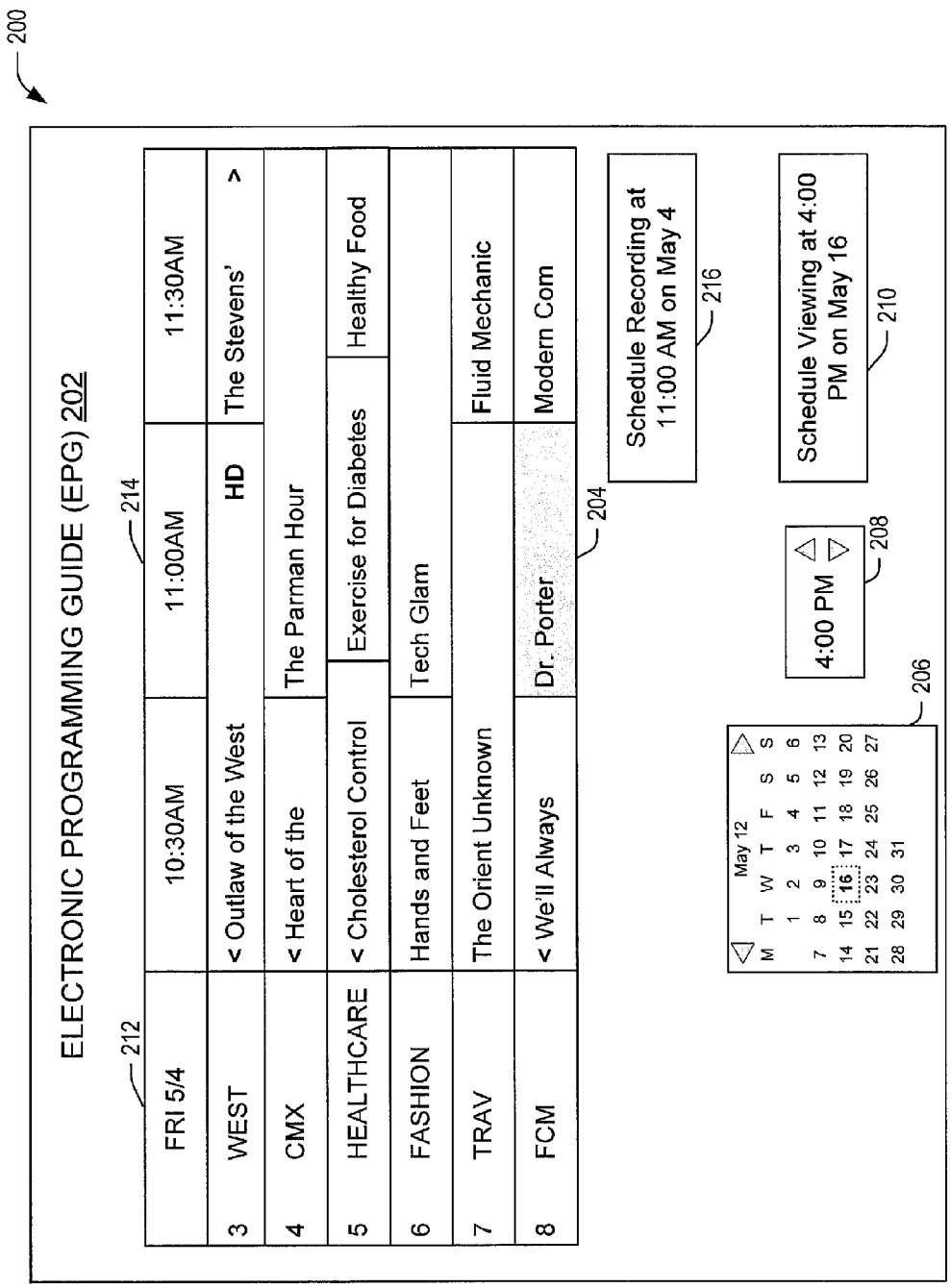
FIG. 2 is a diagram to illustrate a particular example of an electronic program guide (EPG) display of the system of FIG. 1.

Referring to FIG. 2, a diagram of a particular example of an electronic program guide (EPG) display of the system of FIG. 1 is illustrated and is generally designated 200. In an illustrative embodiment, the program 142 and the viewing time 144 may be selected via an EPG 202.

The EPG 202 may display a broadcast time 214 and a program title 204, based on the EPG data 110, corresponding to programs scheduled to air on a broadcast day 212. As illustrated in FIG. 2, the EPG 202 indicates that "Dr. Porter" is scheduled to air at 11:00 am on Friday May 4. The program title 204 may represent the program 142 of FIG. 1. The EPG 202 may include a recording option 216 to schedule recording of the program 142 at the broadcast time 214 on the broadcast day 212. The user may access the EPG 202 via the set-top box device, via a webpage or an application at the mobile device 122, or via a webpage or an application at the computing device 162. For example, the user may select the recording option 216 to schedule a "local" recording (e.g., to the DVR 140 of FIG. 1) of "Dr. Porter" at 11:00 am on Friday May 4. The EPG 202 may also include a date option 206, a time option 208, and a viewing option 210 to schedule a viewing of program 142. The time option 206 and the date option 208 may indicate the viewing time 144 of FIG. 1. For example, the user may select the viewing option 210 to schedule a viewing of "Dr. Porter" at 4:00 PM on May 16, 2012, as shown. The selections made by the user may correspond to the user input 190 of FIG. 1. The user input 190 may be sent to the acquisition and delivery server 112. The scheduler 106 may schedule delivery of the program 142 based on an electronic calendar of the user (e.g., one of the user calendars 108 of FIG. 1).

Referring to FIG. 3, a diagram of a particular example of a user calendar of the system of FIG. 1 is illustrated and is generally designated as 300. In an illustrative embodiment, viewing of a program (e.g., the program 142 of FIG. 1) may be scheduled based on the user calendar 302. The user calendar 302 may be a corporate calendar, a personal calendar, a calendar provided by an internet service provider, or any combination thereof.

The scheduler 106 of FIG. 1 may create a calendar event 306 in the user calendar 302 corresponding to the program 142 at the viewing time 144. For example, the calendar event 306 may correspond to the scheduled viewing of "Dr. Porter," as described with reference to FIG. 2. The distribution module 102 may determine a device to receive delivery of the program 142 based on other calendar events in the user calendar 302 within a time period (e.g., 12 hours) before and after the viewing time 144. For example, the user calendar 302 may include a prior calendar event 308 and a subsequent calendar event 310 within the time period indicating that the user is scheduled to be away from home before and/or after the viewing time 144. Based on the other events 308 and 310, the distribution module 102 may determine that the program 142 is to be delivered to the mobile device 122 instead of to the set-top box device 134. For example, the prior calendar event 308 indicates that the user is scheduled to be in a meeting at work from 10:00 AM to 10:30 AM on May 16, 2012. The subsequent calendar event 310 indicates that the user is scheduled to be in another meeting at work from 5:00 PM to 5:30 PM. Hence, the distribution module 102 may determine that the user is likely to be at work during the 4:00 PM to 4:30 PM scheduled viewing time and thus "Dr. Porter" is to be delivered to the user's laptop computer (or mobile phone/tablet computer), instead of to a set-top box device at the user's home. The user may access the user calendar 302 via a hypertext transfer protocol (HTTP) browser at the set-top box device, via a webpage or an application at the mobile device 122, or via a webpage or an application at the computing device 162.

Figure 4:
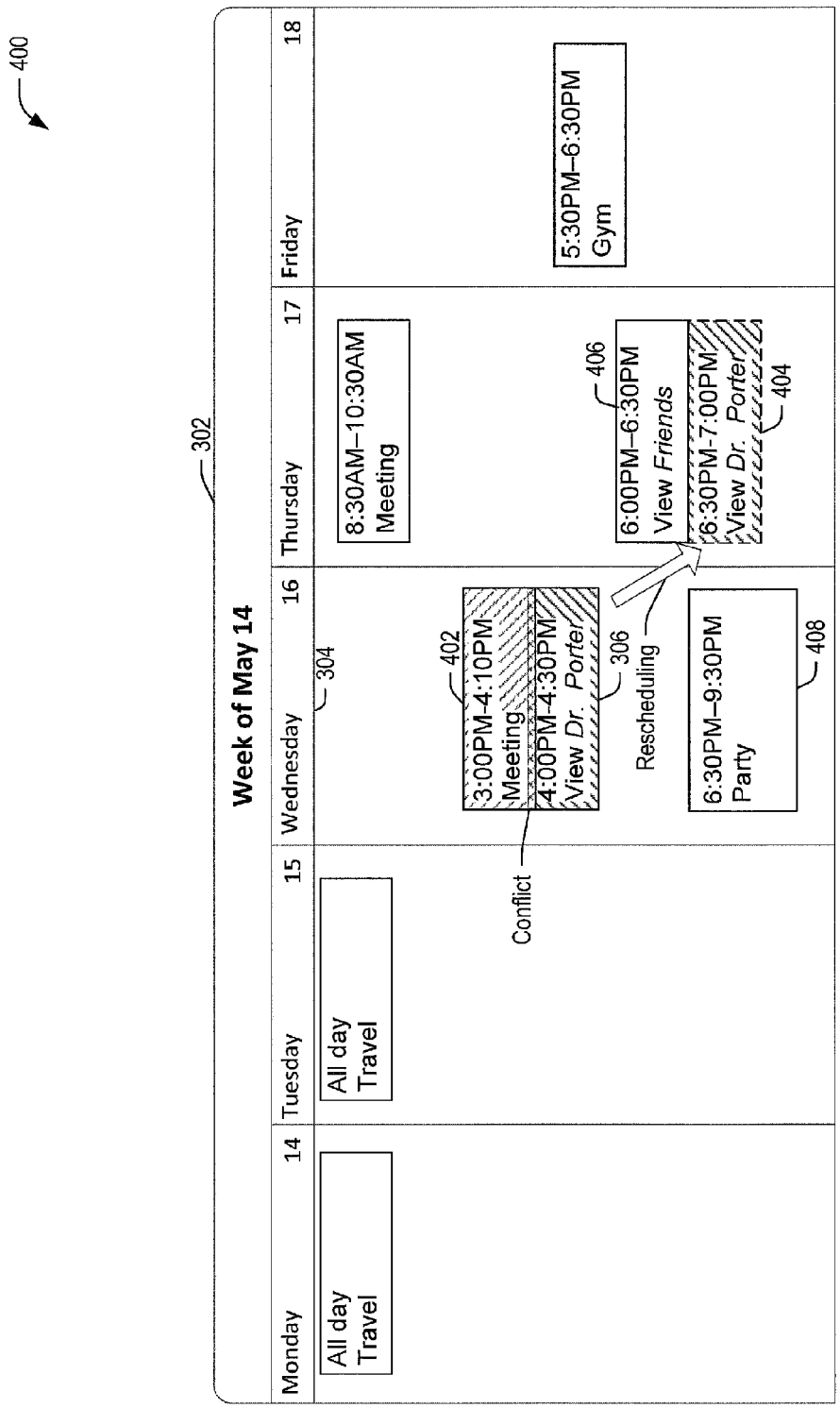
FIG. 4 is a diagram to illustrate another particular example of the user calendar that may be displayed by the system of FIG. 1.

Referring to FIG. 4, a diagram of another particular example of the user calendar of the system of FIG. 1 is illustrated and is generally designated 400. In FIG. 4, an overlapping calendar event 402 overlaps the calendar event 306 during a viewing period that begins at the viewing time of 4:00 pm.

In such situations, the scheduler 106 of FIG. 1 may determine that the overlapping calendar event 402 conflicts with the calendar event 306 based on a type (e.g., meeting) and/or a location (e.g., at work) associated with the overlapping calendar event 402. For example, the overlapping calendar event 402 may indicate that the user is scheduled to be in a meeting at work from 3:00 PM to 4:10 PM that conflicts with the viewing time 144 from 4:00 PM to 4:30 PM. After determining the conflict, the scheduler 106 may reschedule (e.g., automatically, based on user input, and/or based on user profile preferences) viewing of the program 142 by modifying the calendar event 306 to correspond to a new viewing time. The new viewing time may be chosen on a different day than the viewing time 144 based on the user's viewing habits and other calendar events. For example, profile information entered by the user or automatically collected by a server may indicate that the user usually watches programs during a particular time period (e.g., 6 PM-10 PM on weekdays, 2 PM-5 PM on weekends, 8 AM-10 AM on Mondays, etc.). Thus, the scheduler 106 may attempt to reschedule the viewing of "Dr. Porter" from 4:00 PM on Wednesday to between 6 PM-10 PM on Wednesday. However, the user calendar 302 indicates that there is another conflicting calendar event scheduled during the 6 PM-10 PM time period. The user is scheduled to be at a party between 6:30 PM and 9:30 PM on Wednesday. Thus, the scheduler 106 may search for a next available day on which the user calendar 302 indicates that the user is available during a typical television watching time period. Hence, the scheduler 106 may modify the calendar event 306 to calendar event 404 that corresponds to a new viewing time of 6:30 PM on Thursday.

Further, when a viewing event is rescheduled, the distribution module 102 of FIG. 1 may determine whether the program is to be delivered to another device or to the same device based at least in part on the new viewing time. The distribution module 102 may determine that the user is usually at a particular location (e.g., based on the user's viewing history, user settings, the user calendar 302, etc.) at the new viewing time. For example, the distribution module 102 may determine that the user is usually at home after 6 PM on weekdays and a calendar event 406 indicates that the user is scheduled to view "Friends" between 6 PM-6:30 PM on Thursday, May 17 (i.e., does not indicate that the user is scheduled to be away from home). The distribution module 102 may determine that the user is likely to be at home at 6:30 PM on Thursday, May 17 and hence determine that "Dr. Porter" is to be delivered to the set-top box device 134 at the user's home. The first calendar event may include an option for the user to change the delivery device or to add a delivery device.

Referring to FIG. 5, a diagram of another particular example of the user calendar of the system of FIG. 1 is illustrated and is generally designated 500. In FIG. 5, a calendar event 502 overlaps the calendar event 306 during a viewing period that begins at the viewing time of 4:00 PM.

The scheduler 106 of FIG. 1 may determine that the overlapping calendar event 502 does not conflict with the calendar event 306 based on a type (e.g., travel) and/or a location (e.g., away from work) associated with the overlapping calendar event 502. For example, the overlapping calendar event 502 may indicate that the user is scheduled to be travelling all day on Wednesday, May 16 and the scheduler 106 may determine that travelling does not conflict with the 4:00 PM-4:30 PM viewing of "Dr. Porter" associated with the calendar event 306.

The distribution module 102 of FIG. 1 may determine a device to deliver the program 142 to based at least in part on the overlapping calendar event 502. For example, the distribution module 102 may determine that the user is scheduled to be travelling all day on Wednesday, May 16 (i.e., the user will not be at home) and to determine that "Dr. Porter" is to be delivered to the mobile device 122 instead of the set-top box device 134 at the user's home.

Figure 6:
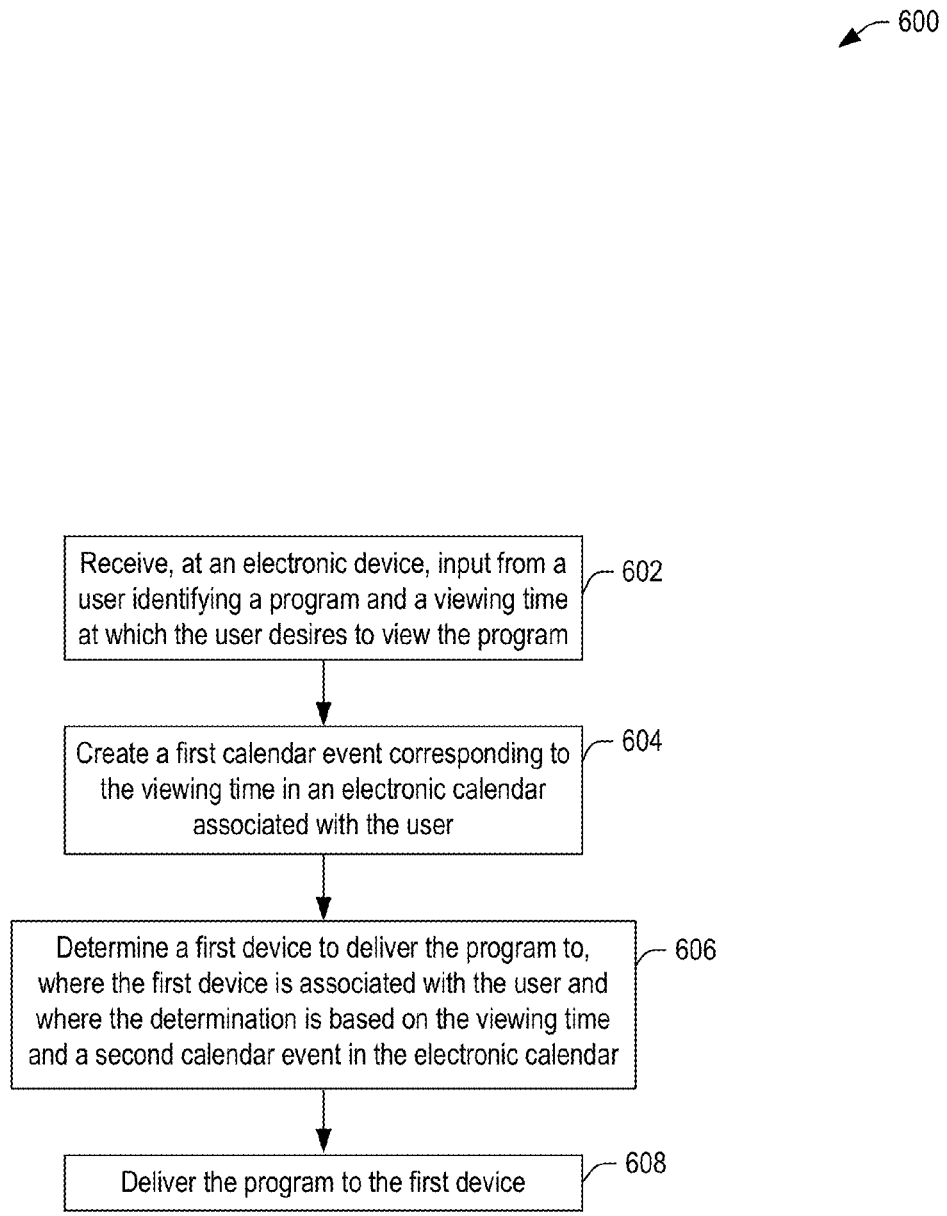
FIG. 6 is a flowchart to illustrate a particular embodiment of a method of delivering content to a device.

FIG. 6 is a flowchart to illustrate a particular embodiment of a method 600 of delivering content to a device. In an illustrative embodiment, the method 600 may be performed by the system 100 of FIG. 1 and illustrated with reference to FIGS. 2-5.

The method 600 may include receiving, at an electronic device, input from a user identifying a program and a viewing time at which the user desires to view the program, at 602, and creating a first calendar event corresponding to the viewing time in an electronic calendar associated with the user, at 604. For example, in FIG. 1, the acquisition and delivery server 112 may receive the user input 190 indicating the program 142 and the viewing time 144. In a particular embodiment, the program 142 and the viewing time 144 may be selected by a user via the EPG 202 of FIG. 2. For example, the user may select the program title 204 of FIG. 2, the date option 206, the time option 208, and the schedule viewing option 210. The scheduler 106 of FIG. 1 may add a calendar event to the calendar events 176. For example, the scheduler 106 may create the calendar event 306 of FIG. 3 in the user calendar 302.

The method 600 may also include determining a first device to deliver the program to, where the first device is associated with the user and where the determination is based on the viewing time and a second calendar event in the electronic calendar, at 606, and delivering the program to the first device at 608. For example, the distribution module 102 of FIG. 1 may determine a device to deliver "Dr. Porter" to based on other calendar events, as described with reference to FIGS. 3-5, and may deliver "Dr. Porter" to the determined device.

Figure 7:
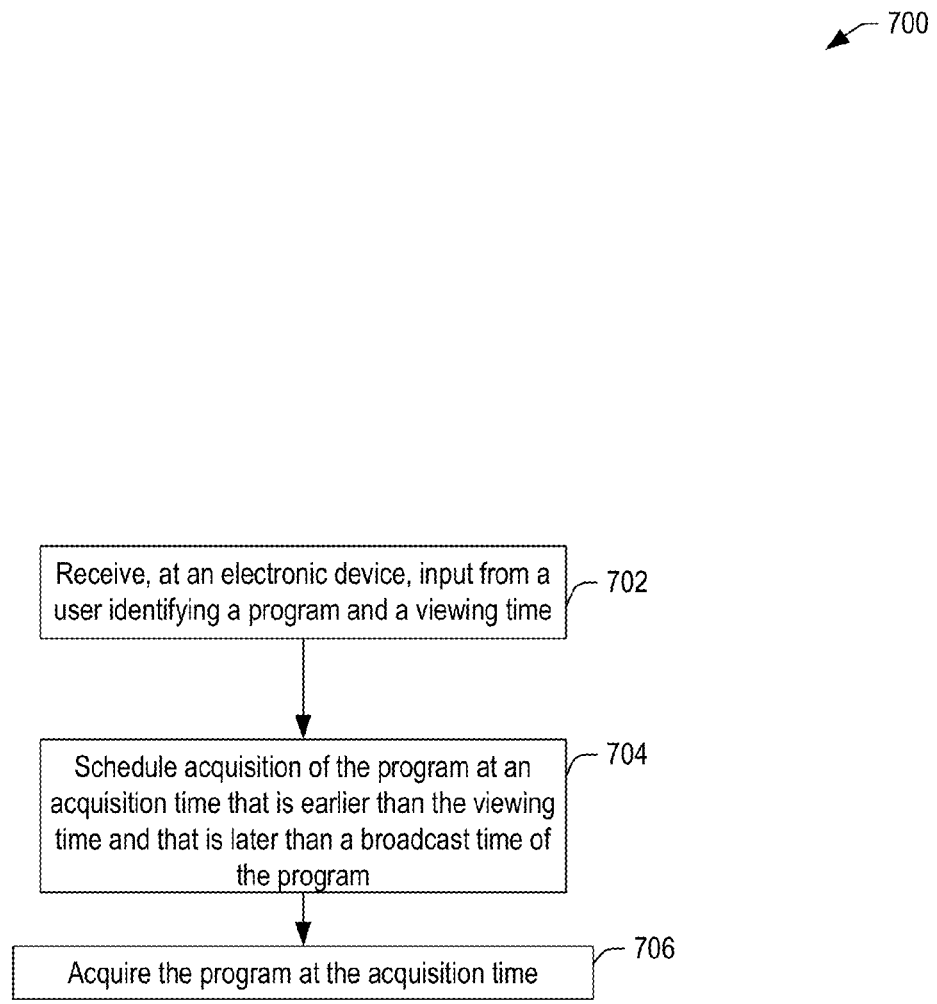
FIG. 7 is a flowchart to illustrate a particular embodiment of a method of acquiring content.

FIG. 7 is a flowchart to illustrate a particular embodiment of a method 700 of acquiring content. In an illustrative embodiment, the method 700 may be performed by the system 100 of FIG. 1 and may be illustrated with reference to FIG. 2.

The method 700 may include receiving, at an electronic device, input from a user identifying a program and a viewing time, at 702. The method 700 may also include scheduling acquisition of the program at an acquisition time that is earlier than the viewing time and that is later than a broadcast time of the program, at 704, and acquiring the program at the acquisition time, at 706. For example, in FIG. 1, the acquisition module 104 may schedule acquisition of "Dr. Porter" earlier than the viewing time 144 of 4:00 PM on May 16, 2012 and later than the broadcast time 214 of FIG. 2 of 11:00 AM on May 4, 2012. To illustrate, the acquisition time may be scheduled for when a re-run of the program 142 airs, where the re-run is scheduled between the broadcast time 214 and the viewing time 144. For example, a re-run of "Dr. Porter" may be scheduled to air on May 10, 2012. The acquired program 142 may be stored based on a device designated to receive delivery of the program 142. For example, when the device is the set-top box device 134, the acquired program 142 may be stored at the DVR 140. Alternatively, when the device is not the set-top box device, the acquired program may be stored at the network DVR 170. It will be appreciated that such flexibility in acquisition time scheduling and storage may enable a service provider to conserve network bandwidth and other resources.

Figure 8:
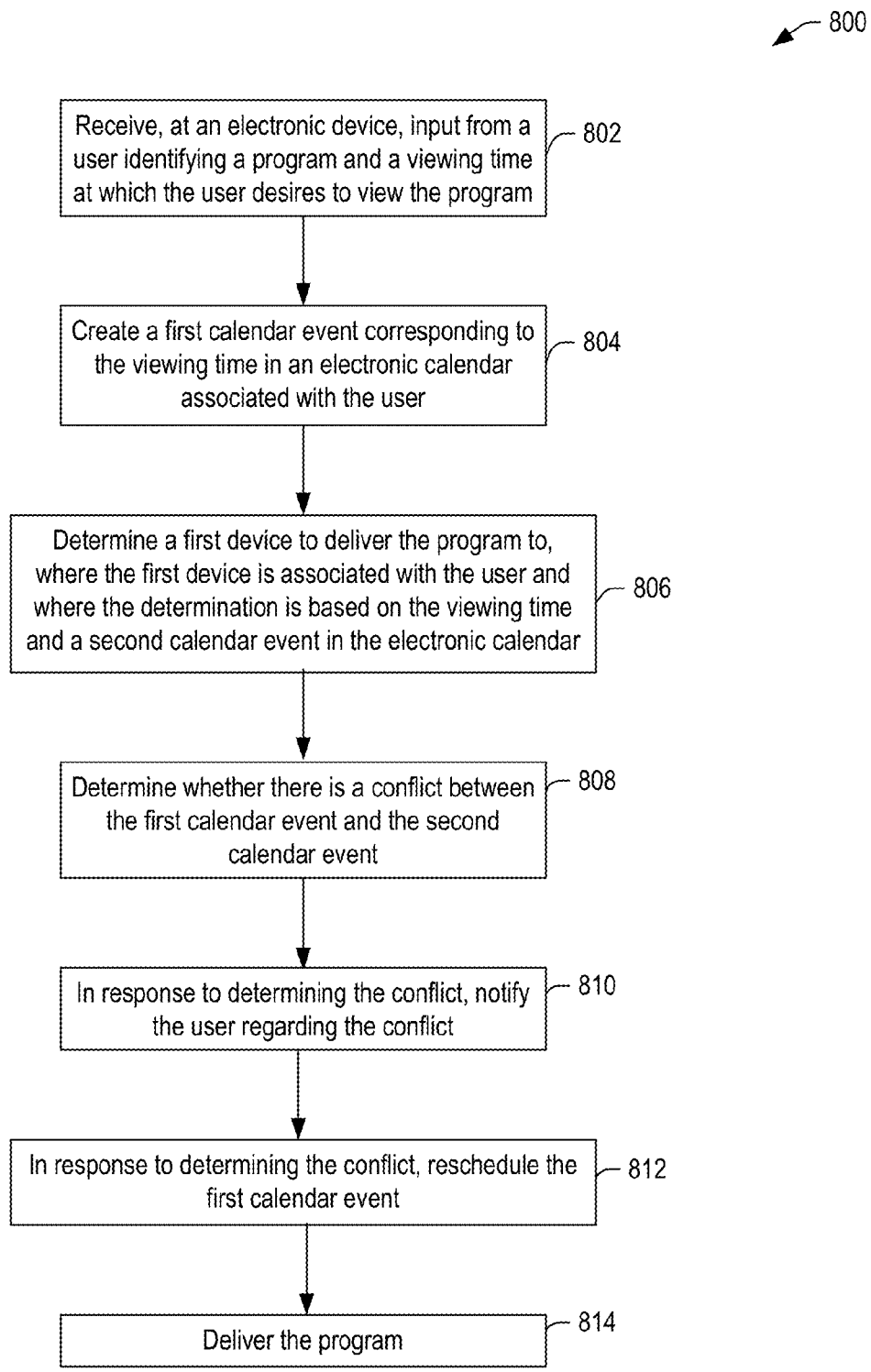
FIG. 8 is a flowchart to illustrate another particular embodiment of a method of delivering content to a device.

FIG. 8 is a flowchart to illustrate another particular embodiment of a method 800 of delivering content to a device. In an illustrative embodiment, the method 800 may be performed by the system 100 of FIG. 1 and may be illustrated with reference to FIGS. 2-5.

The method 800 may include receiving, at an electronic device, input from a user identifying a program and a viewing time at which the user desires to view the program, at 802, creating a first calendar event corresponding to the viewing time in an electronic calendar associated with the user, at 804, and determining a first device to deliver the program to, at 806. The first device is associated with the user and the determination is based on the viewing time and a second calendar event in the electronic calendar. The method 800 may also include determining whether there is a conflict between the first calendar event and the second calendar event, at 808. For example, in FIG. 1, the scheduler 106 may determine whether there is a conflict between the scheduled viewing of "Dr. Porter" (i.e., the calendar event 306 of FIG. 3) at 4:00 PM on May 16 and a meeting (i.e., the calendar event 402 of FIG. 4) scheduled between 3:00 PM and 4:00 PM on the same day, as described with reference to FIG. 4. As another example, the scheduler 106 may determine whether there's a conflict between the scheduled viewing of "Dr. Porter" and an all-day travel event (i.e., the calendar event 502 of FIG. 5) scheduled on the same day, as described with reference to FIG. 5.

The method 800 may also include, in response to determining the conflict, notifying the user regarding the conflict, at 810. The method 800 may include, in response to determining the conflict, rescheduling the first calendar event, at 812. For example, in FIG. 1, the acquisition and delivery server 112 may, in response to determining that there is a conflict, send a notification 128 regarding the conflict to one or more devices (e.g., the mobile device 122, the set-top box device 134, the computing device 162, etc.) associated with the user. The scheduler 106 may reschedule the first calendar event automatically after sending the notification, based on user input requesting rescheduling in response to the notification, or automatically in response to not receiving user input within a certain time after sending the notification. For example, the scheduler 106 may reschedule the viewing of "Dr. Porter" as described with reference to FIG. 4. The method 800 may further include delivering the program (e.g., at or earlier than the rescheduled viewing time), at 814. The method 800 may thus enhance user program scheduling experience because the user may not have to remember to check for calendar conflicts. Instead, the user may rely on the disclosed systems and methods to automatically resolve conflicts and find free time for the user to watch a program.

Figure 9:
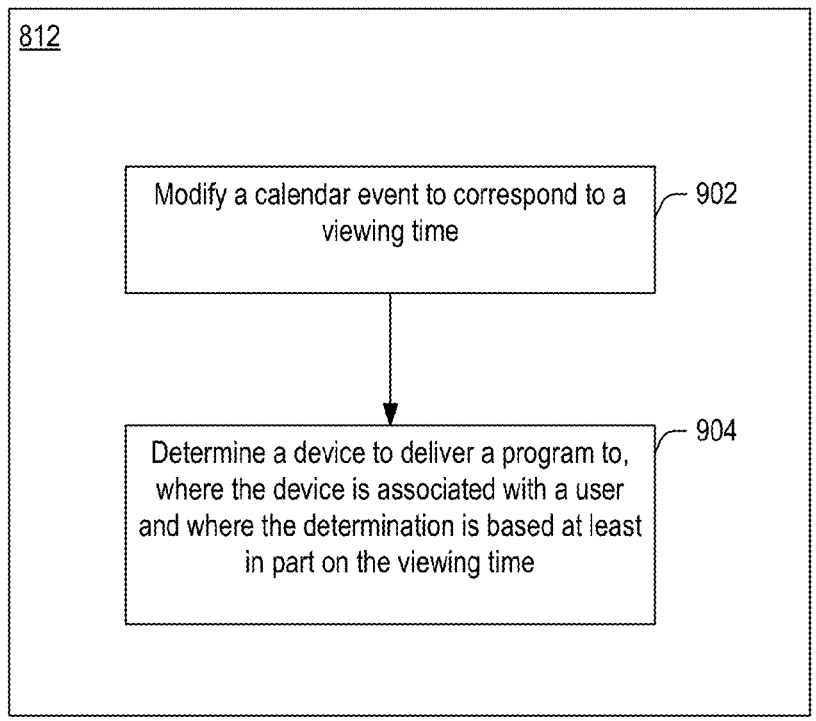
FIG. 9 is a flowchart to illustrate a particular embodiment of a method of rescheduling viewing of content.

FIG. 9 is a flowchart to illustrate a particular embodiment of a method 900 of rescheduling viewing of content. In an illustrative embodiment, the method 900 may be performed by the system 100 of FIG. 1. For example, the method 900 may correspond to the operation 812 of FIG. 8.

The method 900 may include modifying a calendar event to correspond to a viewing time, at 902, and determining a device to deliver a program to, at 904. The device is associated with a user and the determination is based at least in part on the viewing time. For example, in FIG. 1, the scheduler 106 may modify the viewing of "Dr. Porter" to another day and/or time and the distribution module 102 may determine a device to deliver "Dr. Porter" based at least in part on the new day and/or time, as described with reference to FIG. 4. The method 900 may thus enhance user experience because the user may not have to determine which device to have the program delivered to. Instead, the user may rely on the systems and methods to automatically determine the appropriate device to display the content irrespective of user location.

Figure 10:
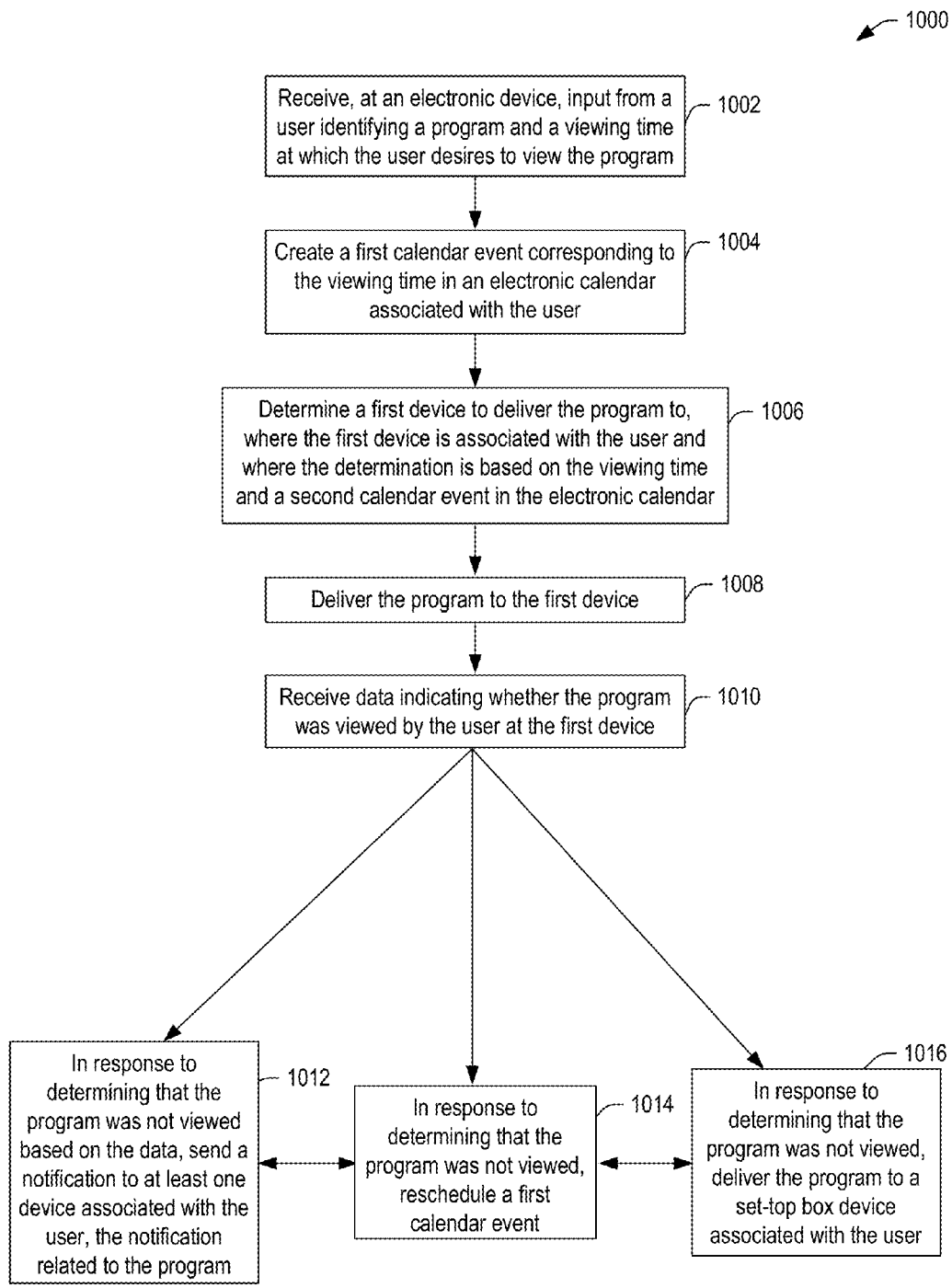
FIG. 10 is a flowchart to illustrate another particular embodiment of a method of delivering content to a device.

FIG. 10 is a flowchart to illustrate another particular embodiment of a method 1000 of delivering content to a device. In an illustrative embodiment, the method 1000 may be performed by the system 100 of FIG. 1 and may be illustrated with reference to FIGS. 2-5.

The method 1000 may include receiving, at an electronic device, input from a user identifying a program and a viewing time at which the user desires to view the program, at 1002. The method 1000 may also include creating a first calendar event corresponding to the viewing time in an electronic calendar associated with the user, at 1004, and determining a first device to deliver the program to, at 1006. The first device is associated with the user and the determination is based on the viewing time and a second calendar event (or multiple other calendar events) in the electronic calendar. The method 1000 may also include delivering the program to the first device, at 1008. The method 1000 may also include receiving data indicating whether the program was viewed by the user at the first device, at 1010. For example, in FIG. 1, the acquisition and delivery server 112 may receive the data 164 from a device associated with the user (e.g., the mobile device 122, the set-top box device 134, or the computing device 162), where the data 164 indicates whether "Dr. Porter" was viewed at the device.

The method 1000 may also include, in response to determining that the program was not viewed based on the data, sending a notification related to the program to at least one device associated with the user, at 1012. For example, in FIG. 1, the acquisition and delivery server 112 may, in response to determining that "Dr. Porter" was not viewed at the device, send the notification 128 regarding "Dr. Porter" to at least one device associated with the user (e.g., the mobile device 122, the set-top box device 134, the computing device 162, etc.).

Alternately, or in addition, the method 1000 may include, in response to determining that the program was not viewed, rescheduling a first calendar event, at 1014, and/or delivering the program to a set-top box device associated with the user, at 1016. For example, in FIG. 1, the scheduler 106 may, in response to determining that "Dr. Porter" was not viewed on the device, reschedule the viewing of "Dr. Porter", as described with reference to FIG. 4. Alternatively, or in addition, the distribution module 102 may deliver "Dr. Porter" to the set-top box device 134.

Figure 11:
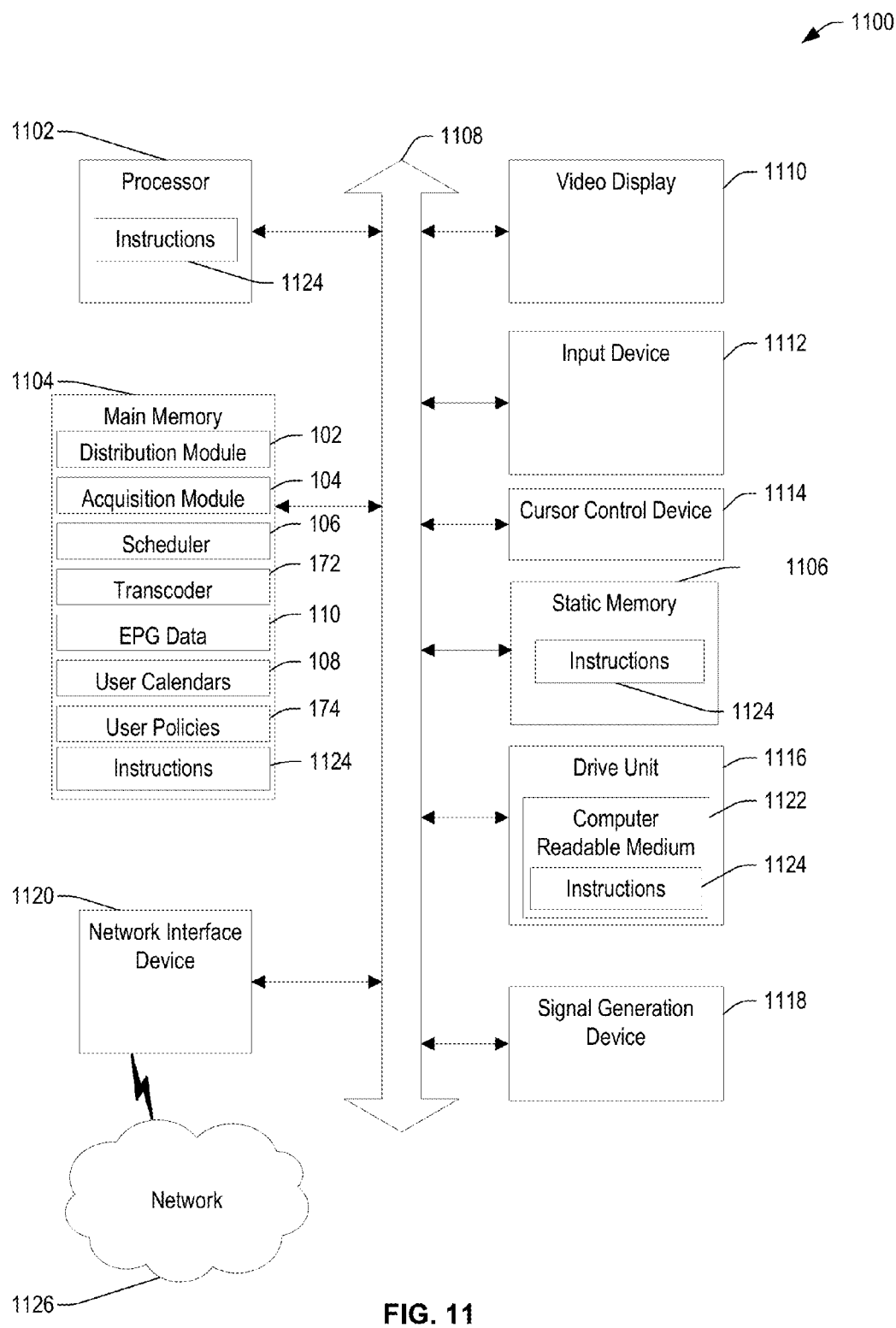
FIG. 11 is a block diagram of an illustrative embodiment of a general computer system operable to support embodiments of computer-implemented methods, computer program products, and system components as illustrated in FIGS. 1-10.

FIG. 11 is a block diagram illustrates an embodiment of a general computer system that is generally designated 1100. The computer system 1100 may be operable to support embodiments of computer-implemented methods, computer program products, and system components as illustrated in FIGS. 1-10. The computer system 1100, or any portion thereof, may operate as a standalone device or may be connected, e.g., using a network, to other computer systems or peripheral devices.

In a networked deployment, the computer system 1100 may operate in the capacity of a set-top box device, a personal computing device, a mobile computing device, or some other computing device. The computer system 1100 can also be implemented as or incorporated into various devices, such as a personal computer (PC), a tablet PC, a personal digital assistant (PDA), a mobile device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 1100 can be implemented using electronic devices that provide voice, video, and/or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU). Moreover, the computer system 1100 may include a main memory 1104 and a static memory 1106 that may communicate with each other via a bus 1108. In a particular embodiment, the main memory 1104 may include (e.g., as processor-executable instructions) the distribution module 102 of FIG. 1, the acquisition module 104 of FIG. 1, the scheduler 106 of FIG. 1, the transcoder 172 of FIG. 1, the EPG Data 110 of FIG. 1, the user calendars 108 of FIG. 1, the user policies 174 of FIG. 1, or any combination thereof.

As shown, the computer system 1100 may further include or be coupled to a video display unit 1110, such as a liquid crystal display (LCD), an organic light emitting diode (OLED), a flat panel display, a solid-state display, or a projection display. Additionally, the computer system 1100 may include an input device 1112, such as a keyboard, a remote control device, and a cursor control device 1114, such as a mouse. In a particular embodiment, the cursor control device 1114 may be incorporated into a remote control device. The computer system 1100 may also include a disk drive unit 1116, a signal generation device 1118, such as a speaker, and a network interface device 1120. The network interface device 1120 may be coupled to other devices (not shown) via a network 1126, such as the wireless network 120 of FIG. 1, the video distribution network 130 of FIG. 1, the internet 160 of FIG. 1, or any combination thereof.

One or more of the components of the computer system 1100 may be included in a set-top box device (e.g. the set-top box device 134), a mobile device (e.g., the mobile device 122), or a computing device (e.g., the computing device 162). In a particular embodiment, the set-top box device, the mobile device, or the computing device may include a tangible computer-readable medium in which one or more sets of instructions, e.g., software, may be embedded. Further, the instructions may be executable by a processor to perform one or more of the methods described herein.

In a particular embodiment, as depicted in FIG. 11, the disk drive unit 1116 may include a tangible computer-readable medium 1122 in which one or more sets of instructions 1124, e.g. software, may be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable non-transitory medium that includes instructions 1124 so that a device connected to the network 1126 can communicate voice, video, or data over the network 1126. Further, the instructions 1124 may be transmitted or received over the network 1126 via the network interface device 1120 (e.g., via uploading and/or downloading of an image upsampling application or program).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

creating, at a server, a first calendar event in an electronic calendar, wherein the first calendar event corresponds to a first viewing time and is associated with delivery, by the server, of media content to a first device associated with a first location; and modifying, at the server, the first calendar event in response to the server detecting a scheduling conflict between the first calendar event at the first viewing time and a second calendar event in the electronic calendar, wherein the second calendar event is associated with a second location distinct from the first location, and wherein modifying the first calendar event resolves the scheduling conflict between the first calendar event and the second calendar event.

2. The method of claim 1, wherein the second calendar event indicates a conflict time period during which a user corresponding to the electronic calendar is scheduled to be at the second location during the first viewing time, and wherein the second calendar event is associated with a meeting or a vacation.

3. The method of claim 1, wherein modifying the first calendar event comprises:

modifying the first calendar event to correspond to a second viewing time; and determining, based on the second viewing time, a second device to receive delivery of the media content, the second device associated with the electronic calendar.

4. The method of claim 3, wherein determining the second device is further based on user profile information.

5. The method of claim 1, wherein the scheduling conflict is detected responsive to the server determining that a user corresponding to the electronic calendar is scheduled to be at the second location during the first viewing time.

6. The method of claim 1, further comprising detecting the scheduling conflict between the first calendar event and the second calendar event when at least a portion of the second calendar event overlaps a viewing period of the first calendar event, wherein the viewing period begins at the first viewing time.

7. The method of claim 1, further comprising identifying the first device based on the first viewing time, wherein the second calendar event is unrelated to delivery of media content.

8. The method of claim 1, further comprising:

creating, at the server, a third calendar event in the electronic calendar, wherein the third calendar event corresponds to a third viewing time and is associated with delivery, by the server, of second media content to the first device; and delivering the second media content to the first device in response to a determination that the third calendar event does not conflict with other calendar events included in the electronic calendar.

9. The method of claim 3, wherein modifying the first calendar event generates a modified first calendar event, and further comprising:
delivering the media content to the second device in response to a determination that the modified first calendar event does not conflict with other calendar events included in the electronic calendar;
receiving data indicating whether the media content has been displayed at the second device; and
in response to a determination that the media content has not been displayed based on the data, sending a notification to a third device.

10. The method of claim 9, wherein the data indicates whether a portion of the media content has been displayed.

11. The method of claim 9, further comprising, in response to determining that the media content has not been displayed via the second device, scheduling a third viewing time corresponding to the media content.

12. The method of claim 3, further comprising sending a notification to a particular device associated with the electronic calendar in response to detecting the scheduling conflict, wherein the notification indicates the second viewing time, the second device, or a combination thereof.

13. The method of claim 1, wherein the second calendar event corresponds to an all day event.

14. A computer-readable storage device storing instructions that, when executed by a processor, cause the processor to perform operations comprising:
creating a first calendar event in an electronic calendar, wherein the first calendar event corresponds to a first viewing time and is associated with delivery of media content to a first device associated with a first location; and
modifying the first calendar event in response to the processor detecting a scheduling conflict between the first calendar event and a second calendar event in the electronic calendar, wherein the second calendar event is associated with a second location distinct from the first location, wherein modifying the first calendar event resolves the scheduling conflict between the first calendar event and the second calendar event.

15. The computer-readable storage device of claim 14, wherein modifying the first calendar event comprises:
modifying the first calendar event to correspond to a second viewing time; and
determining, based on the second viewing time, a second device to receive delivery of the media content, the second device associated with the electronic calendar, wherein identification of the first device is based on user input.

16. The computer-readable storage device of claim 15, wherein the electronic calendar is accessible by the first device or the second device.

17. The computer-readable storage device of claim 14, wherein the operations further comprise:
receiving, from an electronic device, user input indicating a program and the first viewing time, wherein the media content corresponds to the program; and
determining the first device based on the first viewing time.

18. A system comprising:
a processor; and
a scheduler executable by the processor to:
create a first calendar event in an electronic calendar, wherein the first calendar event corresponds to a first viewing time and is associated with delivery of media content to a first device associated with a first location; and
modify the first calendar event in response to the processor detecting a scheduling conflict between the first calendar event and a second calendar event in the electronic calendar, wherein the second calendar event is associated with a second location distinct from the first location, wherein the first calendar event being modified resolves the scheduling conflict between the first calendar event and the second calendar event.

19. The system of claim 18, further comprising an acquisition module executable by the processor to:
receive user input identifying a program and the first viewing time, wherein the media content corresponds to the program;
schedule acquisition of the media content at an acquisition time; and
acquire the media content at the acquisition time.

20. The system of claim 18, wherein modifying the first calendar event generates a modified first calendar event, and further comprising a distribution module executable by the processor to:
determine the first device to deliver the media content to, wherein the first device is determined based on the first viewing time and a third calendar event in the electronic calendar; and
determine a second device to receive delivery of the media content based on a second viewing time that corresponds to the modified first calendar event and in response to detecting the scheduling conflict between the first calendar event and the second calendar event.

* * * * *